United States Patent
Bhide et al.

(10) Patent No.: US 9,226,027 B2
(45) Date of Patent: *Dec. 29, 2015

(54) CROWD SOURCED, CONTENT AWARE SMARTER TELEVISION SYSTEMS

(71) Applicant: International Business Machines Corporation, Armonk, NY (US)

(72) Inventors: Manish A. Bhide, Hyderabad (IN); Srinivas K. Mittapalli, Secunderabad (IN); Nithinkrishna Shenoy, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,027

(22) Filed: Feb. 17, 2014

(65) Prior Publication Data

US 2014/0165092 A1 Jun. 12, 2014

Related U.S. Application Data

(63) Continuation of application No. 13/537,765, filed on Jun. 29, 2012, now Pat. No. 8,689,250.

(51) Int. Cl.
*H04N 7/16* (2011.01)
*H04N 21/454* (2011.01)
*H04N 21/84* (2011.01)
(Continued)

(52) U.S. Cl.
CPC ....... *H04N 21/454* (2013.01); *H04N 21/25891* (2013.01); *H04N 21/266* (2013.01); *H04N 21/2665* (2013.01); *H04N 21/4542* (2013.01); *H04N 21/4756* (2013.01); *H04N 21/6543* (2013.01); *H04N 21/6582* (2013.01); *H04N 21/84* (2013.01); *H04N 21/482* (2013.01)

(58) Field of Classification Search
CPC .. H04N 21/454; H04N 21/4542; H04N 21/84
USPC .......................................... 725/13, 25, 28, 40
See application file for complete search history.

(56) References Cited

U.S. PATENT DOCUMENTS

| 5,583,576 A | 12/1996 | Perlman et al. |
| 5,973,683 A | 10/1999 | Cragun et al. |

(Continued)

OTHER PUBLICATIONS

Van Grove, Jennifer, The Entertainment Industry Gets Its Own Twitter Dashboard, Mashable Social Media, Feb. 23, 2010, <http://mashable.com/2010/02/23/trendrr-real-time-dashboard:/>.

(Continued)

*Primary Examiner* — Nasser Goodarzi
*Assistant Examiner* — Michael B Pierorazio
(74) *Attorney, Agent, or Firm* — Patterson & Sheridan, LLP

(57) ABSTRACT

Method, system, and computer program product for performing an operation, the operation including transmitting a media stream to one or more devices configured to display the media stream on a display coupled to the respective device, receiving user feedback from a first set of devices, of the one or more devices, marking the media stream as inappropriate, and upon determining that the received user feedback exceeds a threshold, marking the media stream as inappropriate, transmitting the marked media stream to a first device, of the one or more devices exclusive of the first set of devices, and wherein the first device is configured to, responsive to receiving the marked media stream, restrict display of the marked media stream on the respective display.

20 Claims, 5 Drawing Sheets

(51) Int. Cl.
*H04N 21/258* (2011.01)
*H04N 21/266* (2011.01)
*H04N 21/2665* (2011.01)
*H04N 21/475* (2011.01)
*H04N 21/6543* (2011.01)
*H04N 21/658* (2011.01)
*H04N 21/482* (2011.01)

(56) References Cited

U.S. PATENT DOCUMENTS

| | | | |
|---|---|---|---|
| 6,112,186 A * | 8/2000 | Bergh et al. | 705/7.32 |
| 6,449,766 B1 | 9/2002 | Fleming | |
| 6,604,239 B1 | 8/2003 | Kohen | |
| 7,117,518 B1 | 10/2006 | Takahashi et al. | |
| 7,430,360 B2 * | 9/2008 | Abecassis | 386/343 |
| 7,574,718 B2 | 8/2009 | Jeong | |
| 7,712,115 B2 | 5/2010 | Van Horck | |
| 8,006,259 B2 | 8/2011 | Drake et al. | |
| 8,176,510 B2 | 5/2012 | Craner | |
| 8,689,250 B2 | 4/2014 | Bhide et al. | |
| 2003/0023969 A1 | 1/2003 | Jeong | |
| 2007/0124756 A1* | 5/2007 | Covell et al. | 725/18 |
| 2007/0204287 A1 | 8/2007 | Conradt et al. | |
| 2008/0155614 A1 | 6/2008 | Cooper et al. | |
| 2009/0034426 A1 | 2/2009 | Luft et al. | |
| 2009/0164655 A1 | 6/2009 | Pettersson et al. | |
| 2009/0172757 A1 | 7/2009 | Aldrey et al. | |
| 2010/0122293 A1 | 5/2010 | Craner | |
| 2010/0131385 A1 | 5/2010 | Harrang et al. | |
| 2010/0250672 A1 | 9/2010 | Vance et al. | |
| 2011/0030009 A1 | 2/2011 | Mountain | |
| 2011/0154385 A1 | 6/2011 | Price et al. | |
| 2011/0283189 A1 | 11/2011 | McCarty | |
| 2012/0011537 A1 | 1/2012 | Kummer et al. | |
| 2012/0059845 A1 | 3/2012 | Covell et al. | |
| 2014/0007150 A1 | 1/2014 | Bhide et al. | |

OTHER PUBLICATIONS

Shetty, Nischal, Twielsen—TV ratings based on twitter tweets, twi5.com, Apr. 2, 2009, <http://www.twi5.com/twielsen-tv-ratings-based-on-twitter-tweets/2747/>.

Let's Talk Tech, Trendrr.tv, 2012, < http://trendrr.tv/technology>.

Overview, Trendrr.tv, 2012, <http://trendrr.tv/solutions>.

Boxee Box at a Glance, Boxee Box by D-Link, Dec. 11, 2011, <http://web.archive.org/web/20111211231227/http://www.dlink.com/boxee/?>.

Boxee Box at a Glance, Boxee Box by D-Link, Feb. 29, 2012, <http://web.archive.org/web/20120229163927/http://www.dlink.com/boxee/>.

The Canadian Rating System, CBSC:CCNR, May 4, 2012, <http://web.archive.org/web/20120504175754/http://www.cbsc.ca/english/agvot/ratings.php>.

The Canadian Rating System, CBSC:CCNR, Jun. 25, 2012, <http://web.archive.org/web/20120625163643/http://www.cbsc.ca/english/agvot/ratings.php>.

* cited by examiner

CROWD SOURCED, CONTENT AWARE SMARTER TELEVISION SYSTEMS

CROSS-REFERENCE TO RELATED APPLICATIONS

This application is a continuation of co-pending U.S. patent application Ser. No. 13/537,765, filed Jun. 29, 2012. The aforementioned related patent application is herein incorporated by reference in its entirety.

BACKGROUND

Embodiments disclosed herein relate to the field of television. More specifically, embodiments disclosed herein relate to crowd sourced television systems.

SUMMARY

Embodiments disclosed herein provide a method, system, and computer program product for performing an operation, the operation including transmitting a media stream to one or more devices configured to display the media stream on a display coupled to the respective device, receiving user feedback from a first set of devices, of the one or more devices, marking the media stream as inappropriate, and upon determining that the received user feedback exceeds a threshold, marking the media stream as inappropriate, transmitting the marked media stream to a first device, of the one or more devices exclusive of the first set of devices, and wherein the first device is configured to, responsive to receiving the marked media stream, restrict display of the marked media stream on the respective display.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
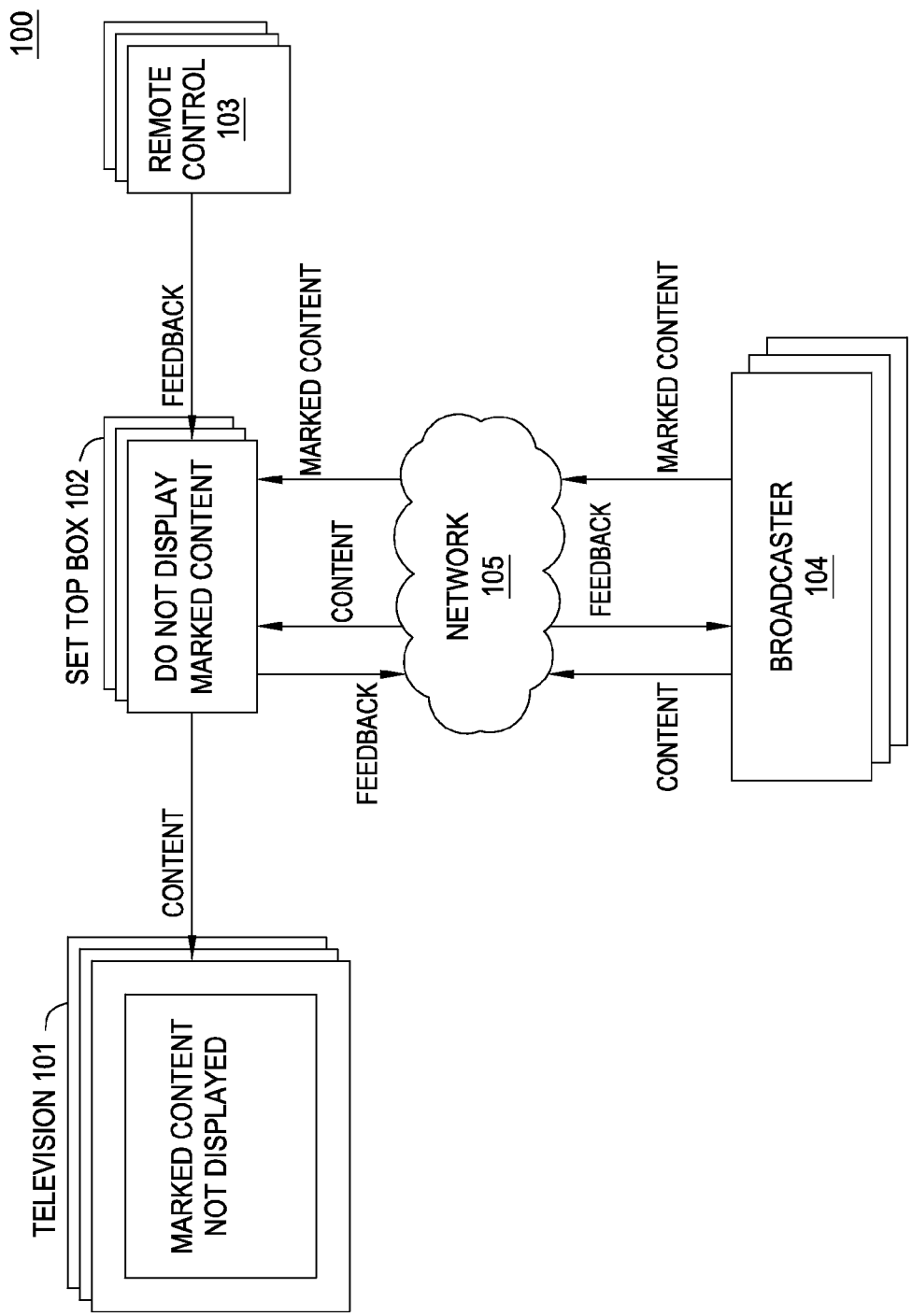
FIG. 1 is a schematic illustrating techniques for crowd sourced television systems, according to one embodiment disclosed herein.

Embodiments disclosed herein provide a method, system, and computer program product for performing an operation, the operation including broadcasting one or more media streams to one or more remote devices, the remote devices configured to provide feedback related to the one or more media streams, the remote devices configured to display a media stream on a television coupled to the remote device. The operation then aggregates, based on a predefined aggregation criterion, feedback received from at least one of the remote devices related to a first media stream. The operation then, upon determining that the aggregated feedback of the first media stream exceeds a predefined threshold for the predefined aggregation criterion, marks the first media stream based on the predefined aggregation criterion, the remote devices configured to, responsive to receiving the marked first media stream, perform a predefined operation to effect prioritized display of the first media stream on the television.

Embodiments disclosed herein describe techniques for crowd sourced television systems which allow viewers of content to provide real time feedback to the broadcaster. The broadcaster may then, responsive to receiving feedback from users, mark the content based on the feedback. For example, if enough viewers indicate that the content is offensive to followers of a particular faith, the content may be tagged as offensive to viewers of that faith while it is being broadcast. Viewers who care not to view offensive content may set preferences in their display devices, which, upon receiving the marked content, may restrict the display of the content to the user. A portion of the content or the entire content may be the subject of viewer feedback, and a portion of the content or the entire content may be marked by the broadcaster. Embodiments disclosed herein allow broadcasters to satisfy the preferences of a plurality of different viewers having numerous preferences. Additionally, ratings and markings may be based on any category of viewer preferences, and marked content may be broadcast as marked content in the future. Viewers may also have the option of subscribing to content categories based on preferences. For example, a follower of the Buddhist faith may subscribe to content feeds preferred by other Buddhist viewers.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications for crowd sourced television systems or related data available in the cloud. For example, the crowd sourced television application could execute on a computing system in the cloud and mark broadcast television content based on user preferences. In such a case, the crowd sourced television application could mark the stream and store user preferences at a storage location in the cloud. Doing so allows a user to access this information from any computing system attached to a network connected to the cloud (e.g., the Internet).

FIG. 1 is a schematic 100 illustrating techniques for crowd sourced television systems, according to one embodiment disclosed herein. As shown, the schematic 100 includes a plurality of televisions 101, each of which may be connected to one (or more) of the set top boxes 102. A remote control 103 may be used to control the set top box 102 and the television 101. The televisions 101, set top boxes 102, and remote controls 103 may be spread across a plurality of different locations, or a single location may have more than one combination of the three. The set top boxes 102 may store user preferences for a plurality of different users. For example, a user may indicate a preference for action movies, that he is a follower of a particular faith, and a member of a particular political party. Based on these preferences, the set top box 102 may make intelligent decisions as to which content to prioritize over others. In prioritizing the content, the set top box may also use the user preferences to block inappropriate content.

As shown, a plurality of broadcasters 104 broadcast a plurality of content (in the form of television programs, media streams, movies, music, etc.) to each of the plurality of set top boxes 102. The broadcaster 104 may broadcast the content over a network 105, which in some embodiments, is the Internet. The network 105 may be any network capable of transmitting the broadcast content, and the particular network should not be considered limiting of embodiments disclosed herein. A set top box 102 receiving the plurality of content from the broadcaster 104 may be controlled by a user using the remote control 103 to select a particular content for viewing on the television 101. While watching the content on the television 101, the user may determine that the content is inappropriate for any number of reasons. The user may mark the entire content, or just a portion of the content as inappropriate. For example, the content may be morally offensive, culturally offensive, religiously offensive, politically offensive, violent, contain inappropriate sexual content, or inappropriate for any reason. The user may, while watching the content, provide feedback using the remote control 103, via a feedback mechanism in the set top box 102, to indicate that the content is not appropriate. The feedback may be binary or on a range of values. A user may also provide feedback on any other number of bases. For example, the user may provide positive feedback indicating the content is religiously, politically, morally, or culturally appropriate. A user may also provide feedback marking the content as belonging to a particular genre, such as sports, comedy, or country western programming. The feedback can be of any type, and should not be considered limiting of the disclosure. The feedback is then transmitted to the broadcaster over the network 105. In some embodiments, the feedback and content (and marked content, discussed later), may be transmitted via the same network; in other embodiments, different networks are used to transmit the feedback and content.

The broadcaster 104, upon receiving feedback, aggregates content-specific feedback received from all users based on any number of a plurality of criteria. Upon determining that the feedback exceeds a predefined threshold for a criteria, the broadcaster 104 may mark the content based on the feedback. For example, if the number of users submitting feedback indicating that the content is religiously offensive to members of the Hindu faith exceeds a predefined threshold, the broadcaster 104 may mark the content as being offensive to members of the Hindu faith. As another example, the content may be marked as being a comedy movie when a specified number of users submit feedback indicating it is a comedy movie. The broadcaster 104 may use any method to tag the content being transmitted to the plurality of set top boxes 102, including using a digital signature of bits accompanying the content. Once the content has been marked by the broadcaster 104, the remaining portion of the content may bear the mark, and subsequent broadcasts may also be marked by the broadcaster 104.

Upon receiving marked content which is being watched by a viewer, the set top box 102 may reference a library of user preferences stored in the set top box 102. For example, the set top box 102 may determine whether the user is of the Hindu faith, and has specified to block content inappropriate or against the Hindu faith. Therefore, upon receiving the marked content indicating the marked content is inappropriate for the Hindu faith, the set top box 102 may stop displaying the content on the television 101. In some other embodiments, the set top box 102 may provide a graphic user interface (GUI) indicating that the marked content is offensive, and that the preferences indicate it should not be displayed. The GUI may give the user the option to block the marked content or continue watching the marked content (which may require a password to override the blockage). In another example, if the marker indicates that the marked content is a comedy movie, the set top box 102, upon determining that user preferences indicate a preference for comedy movies, may display the marked content (if not already being watched), or may prompt the user to determine whether the user wishes to view the content matching a preferred genre.

Figure 2:
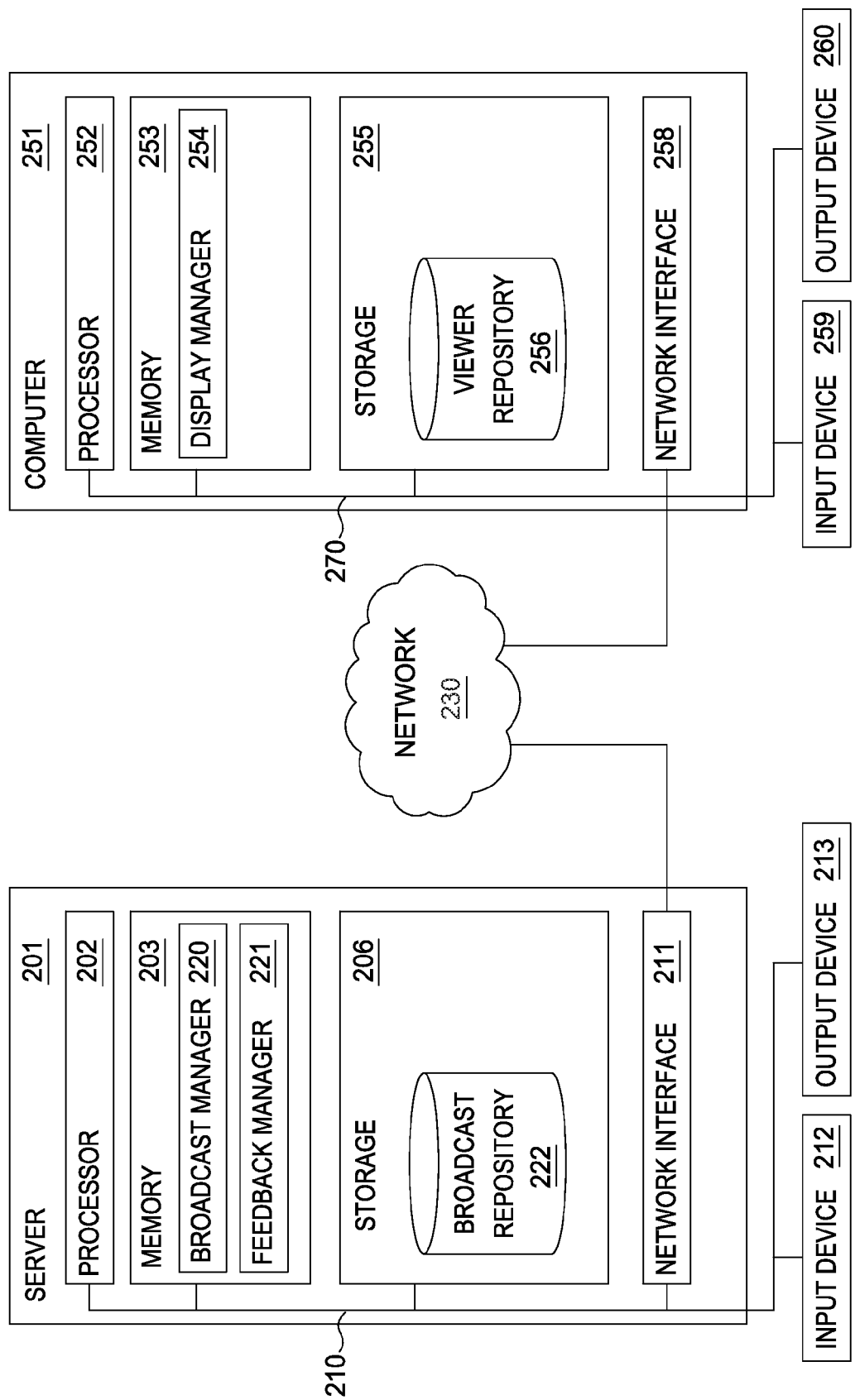
FIG. 2 is a block diagram illustrating a system for crowd sourced television systems, according to one embodiment disclosed herein.

FIG. 2 is a block diagram illustrating a system 200 for crowd sourced television systems, according to one embodiment disclosed herein. As shown, the system includes a server 201. In some embodiments, the server 201 may broadcast a plurality of content over a broadcast network. The server 201 generally includes a processor 202 connected via a bus 210 to a memory 203, a storage 206, a network interface device 211, an input device 212, and an output device 213. In some embodiments, the network interface 211 is used to transmit content to a plurality of receiving devices via the network 230, such as the computer 251. In some other embodiments, the server 201 may broadcast over a different medium, such via an over-the-air signal transmitted by an antenna.

As shown, the memory 203 contains the broadcast manager 220 and the feedback manager 221. Although depicted as separate applications, the functionality of the broadcast manager 220 and the feedback manager 221 may be combined into a single application. The broadcast manager 220 is an application generally configured to broadcast a plurality of content to a plurality of viewers. In some embodiments, the content, which may be television shows, sporting events, movies, or any multimedia content, may be stored in the broadcast repository 222. In some embodiments disclosed herein, the broadcast manager 220 may mark content to convey specific information related to the content. For example, the broadcast manager 220 may mark content as being sexually explicit, violent, or offensive to certain groups of people. The feedback manager 221 is an application generally configured to receive and aggregate viewer feedback related to each of the plurality of content broadcast by the broadcast manager 220. The feedback manager 221 may store viewer feedback related to the content in the broadcast repository 222. Upon determining that the aggregated feedback exceeds a specified threshold, the feedback manager 221 may mark the content as exceeding the threshold. Therefore, if the aggregated feedback exceeds a threshold for violence, the feedback manager 222 may mark the content as being violent. The broadcast manager 220 may transmit the marking along with the content to the computer 251, which receives the broadcast content.

As shown, the storage 206 contains the broadcast repository 222. The broadcast repository 222 is generally configured to store data, including multimedia content, feedback, and a plurality of other information. For example, the broadcast repository 222 may contain a plurality of television programs, a plurality of user feedback related to each of the programs, and a plurality of markers which mark the programs based on the user feedback. The broadcast repository 222 may also store predefined thresholds related to feedback categories which must be met before marking content. For example, a broadcaster may set a threshold for violence at 30 instances of viewer feedback indicating content is violent, which may be restricted to a given time period. Although depicted as a database, the broadcast repository 222 may take any format sufficient to store data. Although depicted as a single database, the multimedia content may be stored in a database separate from a database storing the reviews and markings. Furthermore, the broadcast repository 222 may be stored on a different system than the broadcast manager 220 and the feedback manager 221.

The computer 251 generally includes a processor 252 connected via a bus 270 to a memory 253, a storage 255, a network interface device 258, an input device 259, and an output device 260. In some embodiments, the computer 251 is a set top box connected to a television, the television serving as the output device 260. In some other embodiments, the computer 251 is a television having all the functionality described herein. As shown, the memory 253 includes the display manager 254. The display manager 254 is an application generally configured to monitor and output content for display on the output device 260, as well as provide an interactive user experience for a plurality of viewers. For example, a plurality of users may set up profiles via the display manager 254 which are stored in the viewer repository 256 of the storage 255. Each user may provide different preferences, including but not limited to preferred genres, religious and political views, and tolerance levels for violence, profanity, and sexually explicit content. The display manager 254 is also configured to receive user feedback related to content being displayed on the output device 260, and transmit the feedback to the broadcasting source, in some embodiments, the server 201. Additionally, the display manager 254 may permit interactive viewer voting included in the content being viewed. When the display manager 254 receives marked content from a broadcast source, the display manager 254 may compare the markings to the preferences in the display repository to determine whether action must be taken. For example, the display manager 254 may block (or demote) inappropriate content, promote favorable content, or prompt a user for further input related to the marked content. For example, the display manager 254 may indicate that the content is inappropriate based on the user's preferences, but request a password to override a block which results in the continued display of the content. The display manager 254 may assign a unique identifier to the computer 251 for the purpose of identifying the computer (or the users) who are submitting feedback related to the displayed content.

As shown, the storage 255 contains the display repository 256. The display repository 256 is a data structure configured to store data related to user preferences and profiles. The profile information may include demographic information as well as location, religion, political party, and other details. Although depicted as a database, the display repository 256 may take any form suitable for storing data. Furthermore, the display repository 256 may be stored on a different system than the display manager 254. In some embodiments, the broadcaster may store user (or computer) settings and preferences in server 201, for example, in the broadcast repository 222 of the storage 206. The broadcaster may use unique identifiers to identify and store user preferences and the history of ratings and votes registered by the user for future use.

The server 201 and computer 251 are generally under the control of an operating system (not shown). Examples of operating systems include UNIX, versions of the Microsoft Windows operating system, and distributions of the Linux operating system. (UNIX is a registered trademark of The Open Group in the United States and other countries. Linux is a registered trademark of Linus Torvalds in the United States, other countries, or both. Microsoft and Windows are trademarks of Microsoft Corporation in the United States, other countries, or both.) More generally, any operating system supporting the functions disclosed herein may be used. The processors 202 and 252 are included to be representative of a single CPU, multiple CPUs, a single CPU having multiple processing cores, and the like. Similarly, the memories 203 and 253 may be a random access memory. While the memories 203 and 253 are shown as a single entity, it should be understood that the memories 203 and 253 may each comprise a plurality of modules, and that the memories 203 and 253 each may exist at multiple levels, from high speed registers and caches to lower speed but larger DRAM chips.

The storage 206 and 255 and may be a hard disk drive storage device. Although the storage 206 and 255 are each shown as a single unit, the storage 206 and 255 may each be a combination of fixed and/or removable storage devices, such as fixed disc drives, removable memory cards, optical storage, flash memory or solid state storage devices (SSD). The memory 203 and 253 and the storage 206 and 255 may be part of one virtual address space spanning multiple primary and secondary storage devices. In many cases storage can also be a storage area network (SAN) with one or multiple file systems.

The input devices 212 and 259 may be any device for providing input to the server 201 and computer 251, respectively. For example, a keyboard, keypad, light pen, touch-screen, track-ball, or speech recognition unit, audio/video player, and the like may be used. The output devices 213 and 260 may be any device for providing output to a user of the server 201 and computer 251. In some embodiments, the output device 260 is a television. For example, the output devices 213 and 260 may be any conventional display screen or set of speakers, along with their respective interface cards, i.e., video cards and sound cards. Although shown separately from the input devices 212 and 259, the output devices 213 and 260 and input devices 212 and 259 may be combined. For example, a display screen with an integrated touch-screen, a display with an integrated keyboard, or a speech recognition unit combined with a text speech converter may be used.

Figure 3:
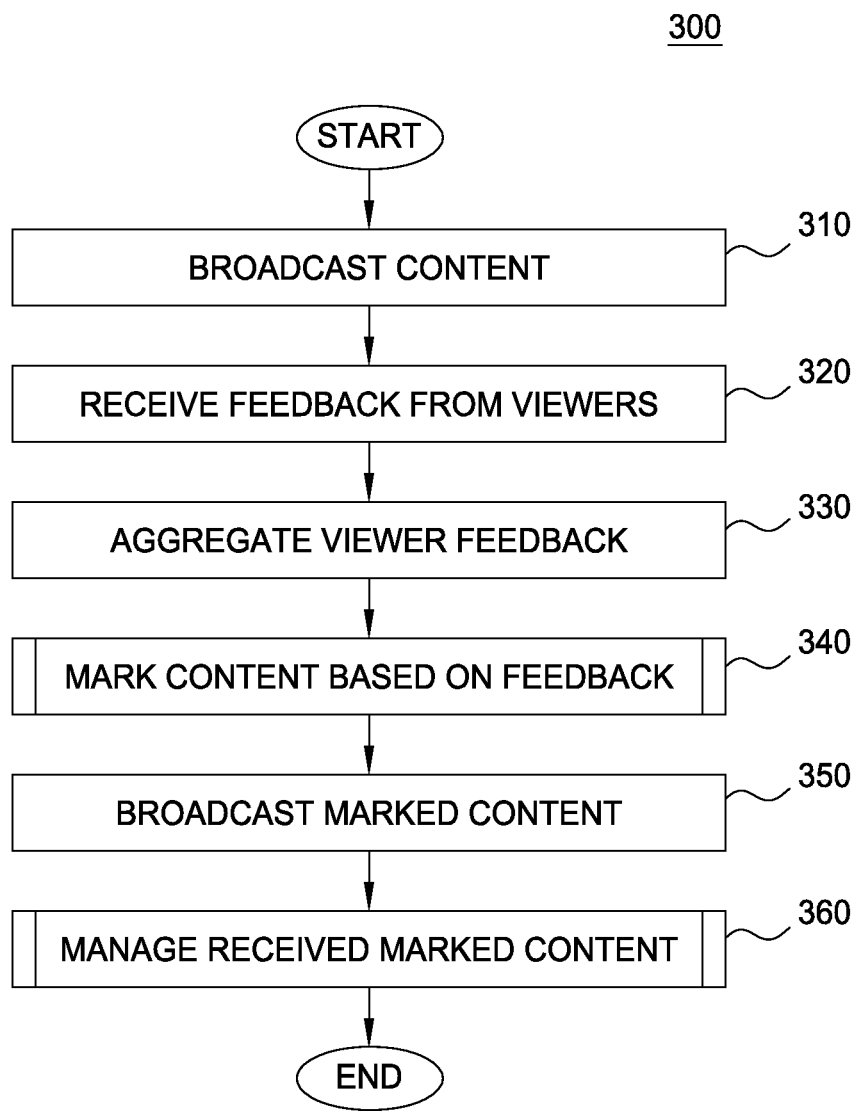
FIG. 3 is a flow chart illustrating a method for crowd sourced television systems, according to one embodiment disclosed herein.

FIG. 3 is a flow chart illustrating a method 300 for crowd sourced television systems, according to one embodiment disclosed herein. Generally, a plurality of content is broadcast to a plurality of viewers, who may provide feedback on the content they are viewing. The feedback may then be aggregated and used to mark content based on the feedback. The marked content is then broadcast to set top box devices, who manage the marked content for the user. At step 310, content is broadcast by a broadcaster to a plurality of subscribers. The content may be of any type of audio or video, including television shows, movies, sporting events, music videos and the like. The content may be broadcast locally, regionally, nationally, or throughout the world. At step 320, feedback from viewers is received by the broadcaster. The feedback may be related to any aspect of the content, including appropriateness, inappropriateness, genre classification, voting, broadcast quality issues, etc. The appropriateness and inappropriateness may be based on any number of categories, including but not limited to religion, politics, profanity, violence, and sexual content. At step 330, the received feedback is aggregated. The feedback may be aggregated based on the particular content the feedback relates to, the type of feedback, and a category of feedback. For example, all positive feedback related to the religious aspect of a Christmas movie may be aggregated together. Negative feedback on the same movie may decrement the positive feedback, or may be considered separately from the positive feedback.

At step 340, the broadcast content is marked based on the received feedback. For example, if the Christmas movie receives positive feedback from Christian viewers, the movie may be tagged as appropriate for Christian viewers. If the content is deemed offensive by a group of viewers in a particular geographic region, the content may be marked as offensive for people in that geographic region. Marking content is described in greater detail with reference to FIG. 4. At step 350, the marked content is broadcast. In one embodiment, broadcasting the marked content comprises adding a digital marking to the broadcast readable by a plurality of set top boxes and televisions which receive the broadcast. Additionally, a permanent association may be made with the content such that subsequent broadcasts of the content may also contain the marking Any number of markings may be made with respect to a particular content, including conflicting positive and negative markings, which will be prioritized and filtered at the viewer's viewing device based on user preferences such that only the appropriate markings are accepted and processed. At step 360, described in greater detail with reference to FIG. 5, the marked content is managed at the viewing device. For example, the marked content may be restricted such that it is not displayed for the viewer. A prompt may also be presented to the viewer indicating that the content has been marked and that further response from the viewer is required (i.e., continue displaying, do not display, enter password to continue displaying).

Figure 4:
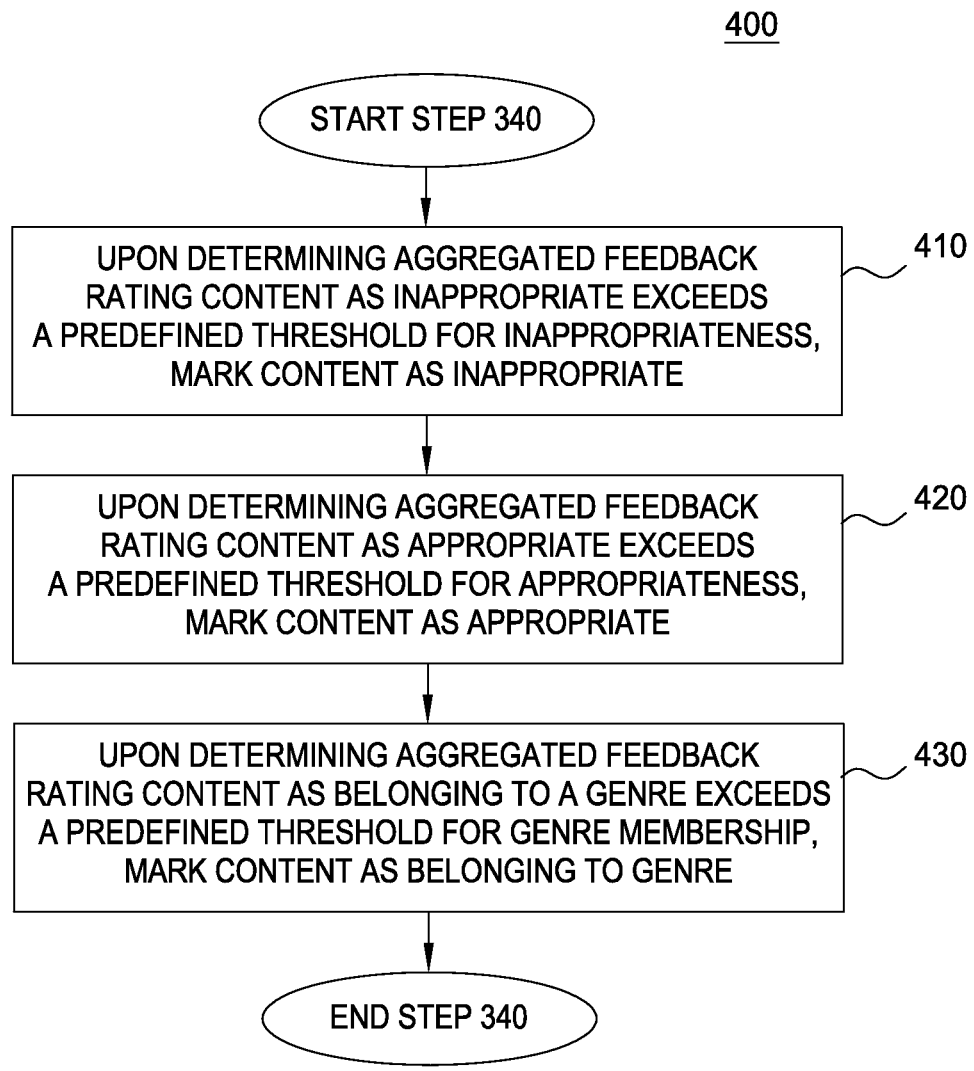
FIG. 4 is a flow chart illustrating a method for marking content streams, according to one embodiment disclosed herein.

FIG. 4 is a flow chart illustrating a method 400 corresponding to step 340 for marking content streams, according to one embodiment disclosed herein. As feedback is received by an entity broadcasting content, the content is aggregated and compared to predefined thresholds. The comparisons may be made based on a count of feedback, or on a mean, median, or mode of the feedback. For example, a minimum of 10 total items of feedback may be set as the predefined threshold for marking content as offensive. As another example, a median number of votes, compared across types (i.e., positive, negative), may be set as the predefined threshold. Although the steps of the method 400 are depicted as a flow chart, one, several, or all of the steps may be implemented to mark content. Additionally, any individual content may be marked zero, one, or many times, for different categories, and conflicting markings may be provided.

At step 410, content is marked as inappropriate upon determining that the aggregated feedback rating the content as inappropriate exceeds a predefined inappropriateness threshold. For example, if the inappropriateness threshold is 50 items of feedback marking content as offensive to a particular religion, once 50 items of feedback mark the content as offensive to a particular religion, the content may be marked as offensive to that particular religion. At step 420, content may be marked as appropriate upon determining that the aggregated feedback rating the content as appropriate exceeds a predefined threshold for appropriateness. For example, if the appropriateness threshold is 25 items of feedback marking content appropriate for children, once 50 items of feedback mark the content as appropriate for children, the content may be marked as appropriate for children. At step 430, content is marked as belonging to a particular genre upon determining that the aggregated feedback rating the content as belonging to the particular genre exceeds a predefined threshold for genre membership. For example, if 15 items of feedback constitutes the threshold for marking content as belonging to the Western movie genre, once 15 items of feedback rating the content as belonging to the Western movie genre are received, the content may be marked as a Western movie. By marking content in such a manner, display devices such as televisions and set top boxes may prioritize received content based on user preferences. If a user has indicated an affinity for Western movies, they may be informed whenever a Western movie is on another channel. If a user has indicated sensitivity to violence (perhaps because of young children in the home), violent content may be restricted from the television. Additionally, the feedback has values for broadcasters. For example, if users in a particular geographic region consistently dislike particular content, a broadcaster may decline to broadcast that content in the future.

Figure 5:
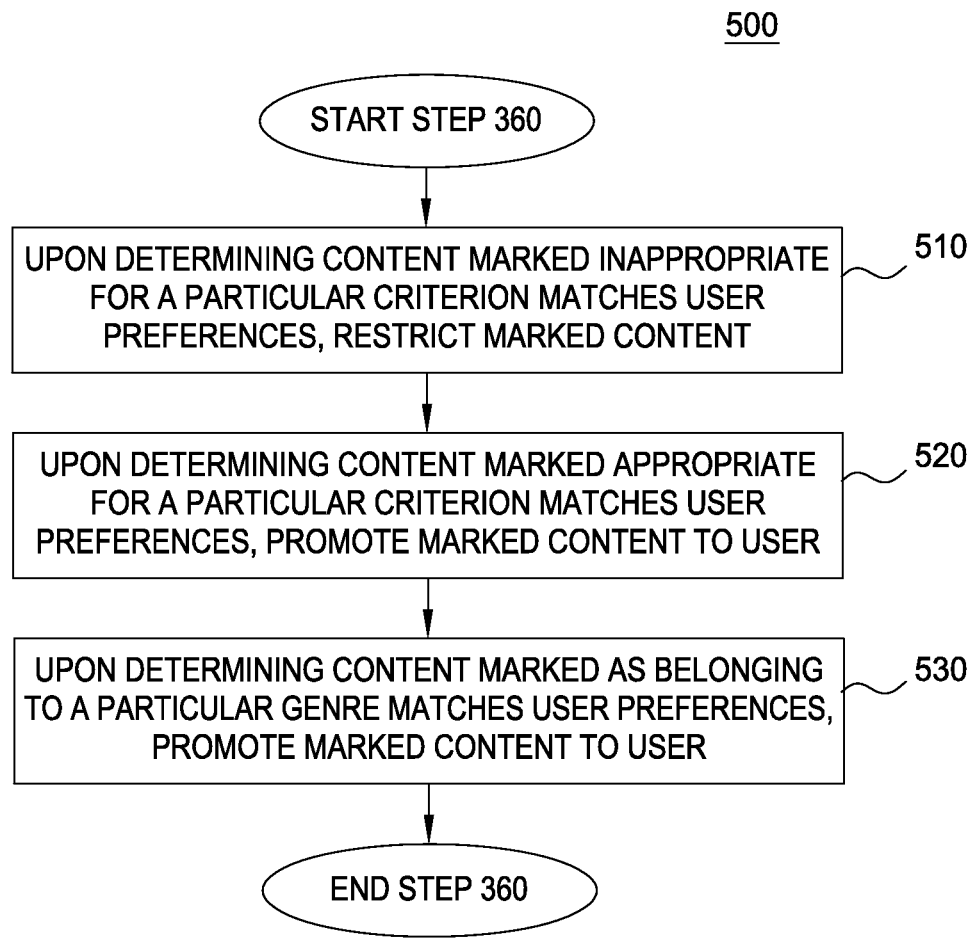
FIG. 5 is a flow chart illustrating a method for managing received marked content, according to one embodiment disclosed herein.

FIG. 5 is a flow chart illustrating a method 500 corresponding to step 360 for managing received marked content, according to one embodiment disclosed herein. Once a television, computer, or set top box receives marked content, the device may retrieve user preferences to determine what actions to take to manage the content. The user preferences may not only specify content-specific preference (such as an aversion to violence), but also an associated action to take in response to receiving marked content (such as not displaying the content). At step 510, marked content is restricted upon determining that the content marked as inappropriate for a particular criterion matches user preferences for that criterion. Restricting marked content may comprise not displaying the content automatically, or prompting the user as to whether they wish to continue watching the content, or providing a password prompt to display restricted content. For example, if content being watched by a user is marked as sexually explicit, the user's preferences may be referenced. If the user preferences indicate that sexually explicit content must be restricted, the content may not be displayed to the viewers. At step 520, marked content is promoted to a user upon determining that content marked as appropriate for a particular criterion matches user preferences. For example, if a user's preferences indicate that the user is a follower of the Hindu faith, content marked as being appropriate for Hindu viewers (possibly by other Hindu viewers) may be promoted to the user. For example, the user may indicate that they prefer that the content automatically be displayed on their television. Or, the user may prefer a prompt which asks the user if they would like to switch to the program which has been marked as appropriate for Hindu viewers. Additionally, in some embodiments, the marked content may be automatically recorded on a storage device, such as a digital video recorder (DVR), if the marked content satisfies recording criteria. At step 530, marked content is promoted to a user upon determining that content marked as belonging to a particular genre matches user preferences. For example, if user preferences indicate the user prefers Western movies, when content marked as a Western movie is detected, the content may be automatically displayed for the user. Or, the user may prefer a prompt which asks the user if they would like to switch to the program which has been marked as a Western movie. Or, the movie may be automatically recorded for the user and saved to a storage device, such as a DVR, if the movie satisfies recording criteria. In some embodiments, the GUI presented to the user on the display may be annotated to indicate the properties of the marked content presented at steps 510, 520, and 530.

Embodiments disclosed herein provide versatility to broadcasters who wish to please the tastes of a varying population, and enables users to ensure that only appropriate and preferred content is displayed on their viewing devices. Broadcasters may make informed decisions regarding future broadcasts based on the user feedback, as well as pinpoint specific areas in which content is deemed inappropriate, or determine when broadcast issues/outages occurred.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    transmitting a media stream to a plurality of devices configured to output the media stream on a respective display coupled to each of the devices;
    receiving user feedback from a first set of devices, of the plurality of devices, marking the media stream as inappropriate;
    aggregating the received user feedback based on an aggregation criterion applied to at least one of: (i) a portion of the media stream, (ii) a type of the user feedback, and (iii) a category of the user feedback; and
    upon determining that the aggregated user feedback exceeds a threshold for the aggregation criterion:
        marking the media stream as inappropriate;
        transmitting the marked media stream to a first device, of the plurality of devices exclusive of the first set of devices; and
        wherein the first device is configured to, responsive to receiving the marked media stream, restrict display of the marked media stream on the display coupled to the first device.

2. The method of claim 1, wherein restricting display of the marked media stream comprises at least one of:
    restricting display of at least part of the marked media stream on the respective display; and
    displaying an indication on the respective display that the media stream is inappropriate.

3. The method of claim 1, wherein the aggregation criterion specifies to determine a count of the received user feedback, wherein the threshold for the aggregation criterion comprises a count of users marking the media stream as inappropriate.

4. The method of claim 1, wherein the type of the user feedback comprises user sentiment related to a genre of the media stream, wherein restricting display of the marked media stream comprises at least one of:
    restricting display of at least part of the marked media stream on the display; and
    displaying an indication on the respective display that the media stream belongs to a genre marked as inappropriate by the viewer.

5. The method of claim 4, the category of the user feedback comprises at least one of: (i) religion, (ii) politics, (iii) violence, and (iv) explicit content.

6. The method of claim 1, wherein the user feedback is entered by a user accessing a graphical user interface generated by the one or more devices and displayed on the respective display.

7. The method of claim 1, wherein the received user feedback comprises feedback from a second user marking the first media stream as inappropriate, wherein a second device of the second user is included in the first set of devices, wherein display of the marked media stream is restricted from the first device based on the feedback from the second user and without any feedback from a first user associated with the first device.

8. A computer program product, comprising:
    a non-transitory computer-readable storage medium having computer-readable program code embodied therewith, the computer-readable program code executable by a processor to perform an operation comprising:
        transmitting a media stream to a plurality of devices configured to output the media stream on a respective display coupled to each of the devices;
        user feedback from a first set of devices, of the plurality of devices, marking the media stream as inappropriate;
        aggregating the received user feedback based on an aggregation criterion applied to at least one of: (i) a portion of the media stream, (ii) a type of the user feedback, and (iii) a category of the user feedback; and
        upon determining that the aggregated user feedback exceeds a threshold for the aggregation criterion:
            marking the media stream as inappropriate;
            transmitting the marked media stream to a first device, of the plurality of devices exclusive of the first set of devices; and
            wherein the first device is configured to, responsive to receiving the marked media stream, restrict display of the marked media stream on the display coupled to the first device.

9. The computer program product of claim 8, wherein restricting display of the marked media stream comprises at least one of:
    restricting display of at least part of the marked media stream on the respective display; and
    displaying an indication on the respective display that the media stream is inappropriate.

10. The computer program product of claim 8, wherein the aggregation criterion specifies to determine a count of the received user feedback, wherein the threshold for the aggregation criterion comprises a count of users marking the media stream as inappropriate.

11. The computer program product of claim 8, wherein the type of the user feedback comprises user sentiment related to a genre of the media stream, wherein restricting display of the marked media stream comprises at least one of:
    restricting display of at least part of the marked media stream on the display; and
    displaying an indication on the respective display that the media stream belongs to a genre marked as inappropriate by the viewer.

12. The computer program product of claim 11, the category of the user feedback comprises at least one of: (i) religion, (ii) politics, (iii) violence, and (iv) explicit content.

13. The computer program product of claim 8, wherein the user feedback is entered by a user accessing a graphical user interface generated by the one or more devices and displayed on the respective display.

14. The computer program product of claim 8, wherein the received user feedback comprises feedback from a second user marking the first media stream as inappropriate, wherein a second device of the second user is included in the first set of devices, wherein display of the marked media stream is restricted from the first device based on the feedback from the second user and without any feedback from a first user associated with the first device.

15. A system, comprising:
one or more computer processors; and
a memory containing a program, which, when executed by the one or more computer processors performs an operation comprising:
  transmitting a media stream to a plurality of devices configured to output the media stream on a respective display coupled to each of the devices;
  receiving user feedback from a first set of devices, of the plurality of devices, marking the media stream as inappropriate;
  aggregating the received user feedback based on an aggregation criterion applied to at least one of: (i) a portion of the media stream, (ii) a type of the user feedback, and (iii) a category of the user feedback; and
  upon determining that the aggregated user feedback exceeds a threshold for the aggregation criterion:
    marking the media stream as inappropriate;
    transmitting the marked media stream to a first device, of the plurality of devices exclusive of the first set of devices; and
    wherein the first device is configured to, responsive to receiving the marked media stream, restrict display of the marked media stream on the display coupled to the first device.

16. The system of claim 15, wherein restricting display of the marked media stream comprises at least one of:
  restricting display of at least part of the marked media stream on the respective display; and
  displaying an indication on the respective display that the media stream is inappropriate.

17. The system of claim 15, wherein the aggregation criterion specifies to determine a count of the received user feedback, wherein the threshold for the aggregation criterion comprises a count of users marking the media stream as inappropriate.

18. The system of claim 15, wherein the type of the user feedback comprises user sentiment related to a genre of the media stream, wherein restricting display of the marked media stream comprises at least one of:
  restricting display of at least part of the marked media stream on the display; and
  displaying an indication on the respective display that the media stream belongs to a genre marked as inappropriate by the viewer.

19. The system of claim 18, the category of the user feedback comprises at least one of: (i) religion, (ii) politics, (iii) violence, and (iv) explicit content.

20. The system of claim 15, wherein the user feedback is entered by a user accessing a graphical user interface generated by the one or more devices and displayed on the respective display.

* * * * *